(12) United States Patent
Li et al.

(10) Patent No.: US 10,564,439 B2
(45) Date of Patent: Feb. 18, 2020

(54) THREE-DIMENSIONAL DISPLAY DEVICE AND METHOD (71) Applicant: BOE TECHNOLOGY GROUP CO., LTD., Beijing (CN)

(72) Inventors: Zhongxiao Li, Beijing (CN);
Xiaochuan Chen, Beijing (CN);
Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/175,794

(22) Filed: Oct. 30, 2018

(65) Prior Publication Data
US 2019/0293951 A1 Sep. 26, 2019

(30) Foreign Application Priority Data

Mar. 21, 2018 (CN) .......................... 2018 1 0234430

(51) Int. Cl.
G02B 27/22 (2018.01)
G02F 1/29 (2006.01)
(52) U.S. Cl.
CPC .......... *G02B 27/2214* (2013.01); *G02F 1/29* (2013.01)
(58) Field of Classification Search
None
See application file for complete search history.

(56) References Cited

U.S. PATENT DOCUMENTS

| 2005/0046951 A1 | 3/2005 | Sugihara et al. |
| 2006/0203338 A1 | 9/2006 | Pezzaniti |
| 2014/0160379 A1* | 6/2014 | Wu ..................... G02B 27/2214 349/15 |

(Continued)

FOREIGN PATENT DOCUMENTS

| CN | 201749269 U | 2/2011 |
| CN | 102122077 A | 7/2011 |
| CN | 102830495 A | 12/2012 |

(Continued)

OTHER PUBLICATIONS

First Chinese Office Action dated Apr. 26, 2019, received for corresponding Chinese Application No. 201810234430.8.

(Continued)

*Primary Examiner* — Thanh Nhan P Nguyen
(74) *Attorney, Agent, or Firm* — Kinney & Lange, P.A.

(57) ABSTRACT

A three-dimensional display device and method are provided. The display device includes a display panel emitting light including first and second components, wherein polarization directions of the first and second components are different first and second directions, respectively; first and second lenticulations configured to split the first and the second components, respectively, and to converge light rays in the first and the second components to first and second viewpoints, respectively, wherein the first and the second viewpoints are in first and second planes, respectively, and distances between the first and the second planes and the display panel are different; and a light selectively-transmissible layer configured to operate in first and second states, wherein in the first and the second states, the first and the second components transmit through the light selectively-transmissible layer, respectively.

19 Claims, 5 Drawing Sheets (56) References Cited

U.S. PATENT DOCUMENTS

2015/0346498 A1   12/2015   Zhong et al.
2017/0363877 A1   12/2017   Zhu et al.

FOREIGN PATENT DOCUMENTS

| CN | 202794716 U | 3/2013 |
| CN | 103048842 A | 4/2013 |
| CN | 103246069 A | 8/2013 |
| CN | 103792672 A | 5/2014 |
| CN | 104020573 A | 9/2014 |
| CN | 104950544 A | 9/2015 |
| CN | 105372824 A | 3/2016 |
| CN | 107561724 A | 1/2018 |
| CN | 108388019 A | 8/2018 |

OTHER PUBLICATIONS

International Search Report and English Translation of Box V of the Written Opinion dated Feb. 27, 2019, received for corresponding Chinese Application No. PCT/CN2018/121467.

\* cited by examiner

THREE-DIMENSIONAL DISPLAY DEVICE AND METHOD

CROSS-REFERENCE TO RELATED APPLICATION

The present application claims priority to Chinese patent application No. 201810234430.8 filed on Mar. 21, 2018, the disclosure of which is incorporated herein in its entirety by reference.

TECHNICAL FIELD

The present disclosure relates the field of display, and specifically relates to a three-dimensional (3D) display device and a three-dimensional (3D) display method.

BACKGROUND

Three-dimensional display techniques may include a glass type three-dimensional display technique and a glass-free type three-dimensional display technique. As compared with the glass type three-dimensional display technique, the glass-free type three-dimensional display technique more satisfies peoples' requirements. Except glass type three-dimensional display products used in cinemas, most three-dimensional display products use glass-free three-dimensional display products. A display device based on the glass-free display technique is generally formed of a two-dimensional (2D) display screen and three-dimensional (3D) optical grating. The 2D display screen may be a liquid crystal display or an organic light emitting diode (OLED) display, and the 3D grating may be a stationary metal grating, a resin grating, or a liquid crystal grating. The liquid crystal grating has better operability, and is more advantageous over the stationary metal grating.

SUMMARY

A three-dimensional display device and a display method are provided in the present disclosure.

In a first aspect, the present disclosure provides a three-dimensional display device. The three-dimensional display device includes a display panel including a display surface, wherein the display surface is configured to emit natural light including a first light component and a second light component, a polarization direction of the first light component is a first direction, and a polarization direction of the second light component is a second direction, and the first direction is different from the second direction; a first lenticulation above the display surface and configured to split the first light component and converge light rays carrying different image information in the first light component to at least two different first viewpoints, respectively, wherein the at least two different first viewpoints are in a first plane parallel to the display panel, and a distance between the first plane and the display surface of the display panel is a first distance; a second lenticulation at one side of the first lenticulation facing away from the display surface and configured to split the second light component and converge light rays carrying different image information in the second light component to at least two different second viewpoints, respectively, wherein the at least two different second viewpoints are in a second plane parallel to the display panel, and a distance between the second plane and the display surface of the display panel is a second distance; and a light selectively-transmissible layer at a side of the second lenticulation facing away from the first lenticulation and configured to operate in a first operational state or a second operational state, wherein in the first operational state, the first light component transmits through the light selectively-transmissible layer and in the second operational state, the second light component transmits through the light selectively-transmissible layer, wherein the first distance is different from the second distance.

Optionally, light selective-transmissible layer includes a polarizer at the side of the second lenticulation facing away from the first lenticulation, wherein a direction of a light transmission axis of the polarizer is configured to be the first direction or the second direction; and a light selection sublayer between the polarizer and the second lenticulation, and configured to: in a case that the direction of the light transmission axis of the polarizer is the first direction, transmit the first light component and the second light component when the light selectively-transmissible layer operates in the first operational state, and change the polarization direction of the first light component to the second direction and change the polarization direction of the second light component to the first direction when the light selectively-transmissible layer operates in the second operational state; in a case that the direction of the light transmission axis of the polarizer is the second direction, change the polarization direction of the first light component to the second direction and change the polarization direction of the second light component to the first direction when the light selectively-transmissible layer operates in the first operational state, and transmit the first light component and the second light component when the light selectively-transmissible layer operates in the second operational state.

Optionally, the first direction is perpendicular to the second direction, and the light selection sublayer is a liquid crystal cell.

Optionally, the light selection sublayer includes a first liquid crystal layer and two first substrates, the two first substrates are opposite to each other, between the second lenticulation and the polarizer and perpendicular to the polarizer, and the first liquid crystal layer is between the two first substrates, and a side of each of the first substrates facing towards the liquid crystal layer is provided with a first transparent electrode. In a case that the direction of the light transmission axis of the polarizer is the first direction, when the light selectively-transmissible layer operates in the first operational state, the first transparent electrodes are applied with a voltage; and when the light selectively-transmissible layer operates in the second operational state, the first transparent electrodes are not applied with the voltage. In a case that the direction of the light transmission axis of the polarizer is the second direction, when the light selectively-transmissible layer operates in the first operational state, the first transparent electrodes are not applied with the voltage; and when the light selectively-transmissible layer operates in the second operational state, the first transparent electrodes are applied with the voltage.

Optionally, the light selection sublayer is a Twisted Nematic liquid crystal cell, a first alignment layer is arranged on a first one of the first transparent electrodes adjacent to the polarizer and an alignment direction of the first alignment layer is parallel to the direction of the light transmission axis of the polarizer, and a second alignment layer is arrange on a second one of the first transparent electrodes away from the polarizer and an alignment direction of the second alignment layer is perpendicular to the direction of the light transmission axis of the polarizer.

Optionally, the light selection sublayer is a liquid crystal half-wave plate, an angle between an initial alignment direction of the first liquid crystal layer and the direction of the light transmission axis of the polarizer is 45 degrees, and a thickness d of the first liquid crystal layer satisfies an equation (ne−no)*d=λ/2, wherein λ is a wavelength of incident light incident on the first liquid crystal layer, no is a refractive index of the first liquid crystal layer to ordinary light, and ne is a refractive index of the first liquid crystal layer to extraordinary light.

Optionally, the first lenticulation includes two third substrates opposite to each other and a third liquid crystal layer between the third substrates, a first planar electrode is arranged on a first one of the third substrates; a plurality of stripe electrodes spaced from each other and parallel to each other is arranged on a second one of the third substrates; an initial alignment direction of the third liquid crystal layer is the first direction; the first planar electrode and the plurality of first stripe electrodes are applied with different voltages so that liquid crystal molecules in the third liquid crystal layer rotates by different angles and form a cylindrical lens structure having a plurality of first lens regions.

Optionally, the first lenticulation is a solid-state cylindrical lenticulation having a plurality of first lens regions and formed of a first uniaxial crystal, and a direction of an optical axis of the first uniaxial crystal is the first direction.

Optionally, the first lenticulation includes a cylindrical lens structure formed of a transparent material and including a plurality of hollow first lens regions, each of the plurality of first lens regions is filled with liquid crystals, a light incident surface of each of the plurality of first lens regions is a plane, and a light emergent surface of the each of the plurality of first lens regions is a cambered surface protruding towards the light selectively-transmissible layer, and a first alignment layer is arranged on at least one of the light incident surface or the light emergent surface of the each of the plurality of first lens regions and is configured to align the liquid crystals in the each of the plurality of first lens regions along the first direction.

Optionally, a focus point of each of the plurality of first lens regions is on the display surface of the display panel.

Optionally, the first distance L1 is calculated according to an equation of $$D1 = \frac{W_p L1}{Q + W_p},$$

and the second distance L2 is calculated according to an equation of $$D2 = \frac{W_p L2}{Q + W_p},$$

wherein

D1 is a distance between the first lenticulation and the display surface of the display panel, D2 is a distance between the second lenticulation and the display surface of the display panel, and Wp is a size of each pixel in the display panel, and Q is a pupillary distance of human eyes.

Optionally, the second lenticulation includes two fourth substrates opposite to each other and a fourth liquid crystal layer between the fourth substrates, a second planar electrode is arranged on a first one of the fourth substrates; a plurality of second stripe electrodes spaced from each other and parallel to each other is arranged on a second one of the fourth substrates; an initial alignment direction of liquid crystal molecules in the fourth liquid crystal layer is the second direction; the second planar electrode and the plurality of second stripe electrodes are applied with different voltages so that the liquid crystal molecules in the fourth liquid crystal layer rotate by different angles and form a cylindrical lens structure having a plurality of second lens regions.

Optionally, the second lenticulation is a solid-state cylindrical lenticulation having a plurality of second lens regions and formed of a second uniaxial crystal, and a direction of an optical axis of the second uniaxial crystal is the second direction.

Optionally, the second lenticulation includes a cylindrical lens structure formed of a transparent material and including a plurality of hollow second lens regions, wherein each of the plurality of second lens regions is filled with liquid crystals, a light incident surface of each of the plurality of second lens regions is a plane, and a light emergent surface of the each of the plurality of second lens regions is a cambered surface protruding towards the light selectively-transmissible layer, and a second alignment layer is arranged on at least one of the light incident surface or the light emergent surface of the each of the plurality of second lens regions and is configured to align the liquid crystals in the each of the plurality of second lens regions along the second direction.

Optionally, a focus point of each of the plurality of second lens regions is on the display surface of the display panel.

Optionally, the light selection sublayer is attached to the first lenticulation by a first adhesive layer, the first lenticulation is attached to the second lenticulation by a second adhesive layer, and the first lenticulation is attached to the display panel by a third adhesive layer.

Optionally, the first direction is parallel to the display surface, the second direction is perpendicular to the display surface; or the first direction is perpendicular to the display surface, the second direction is parallel to the display surface.

In a second aspect, the present disclosure provides a display method applied to the above three-dimensional display device. The method includes: splitting the first light component and converge different light rays carrying different image information in the first light component to at least two different first viewpoints, respectively, by the first lenticulation; and splitting the second light component and converge different light rays carrying different image information in the second light component to at least two different second viewpoints, respectively, by the second lenticulation.

In a third aspect, the present disclosure further provides a display method applied to the above three-dimensional display device. The method includes determining whether the first transparent electrodes are applied with a voltage or not; transmitting the first light component when the first transparent electrodes are applied with the voltage; and transmitting the second light component when the first transparent electrodes are not applied with the voltage.

DETAILED DESCRIPTION

Features and principles of the present disclosure will be described in details hereinafter in combination with figures. Embodiments of the present disclosure serve to explain the present disclosure, but do not limit the protection scope of the present disclosure.

A three-dimensional display device and a three-dimensional display method in the present disclosure may solve a problem that a viewing distance of a display device such as a cellular phone, a display, or a TV is fixed when a glass-free three-dimensional display technique is used in the display device.

Figure 1:
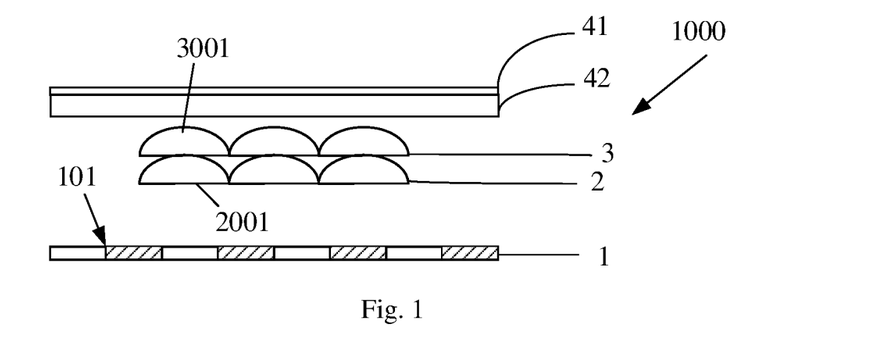
FIG. 1 is a structural schematic diagram of a three-dimensional display device in some embodiments of the present disclosure.

As shown in FIG. 1, some embodiments of the present disclosure provide a three-dimensional (3D) display device 1000. The three-dimensional display device includes a display panel 1, a first lenticulation 2, a second lenticulation 3, and a light selectively-transmissible layer 4 stacked sequentially. The display panel 1 emits natural light and includes a display surface 101. The natural light may include a first light component and a second light component. The first light component is a component of the natural light, and a polarization direction of the first light component is a first direction; and the second light component is a component of the natural light, and a polarization direction of the second light component is a second direction, wherein the first direction is different from the second direction. In actual applications, the first direction and the second direction may be arranged to form an angle between the first direction and the second direction according to actual requirements. In some embodiments of the present disclosure, optionally, the first direction is perpendicular to the second direction.

Figure 2:
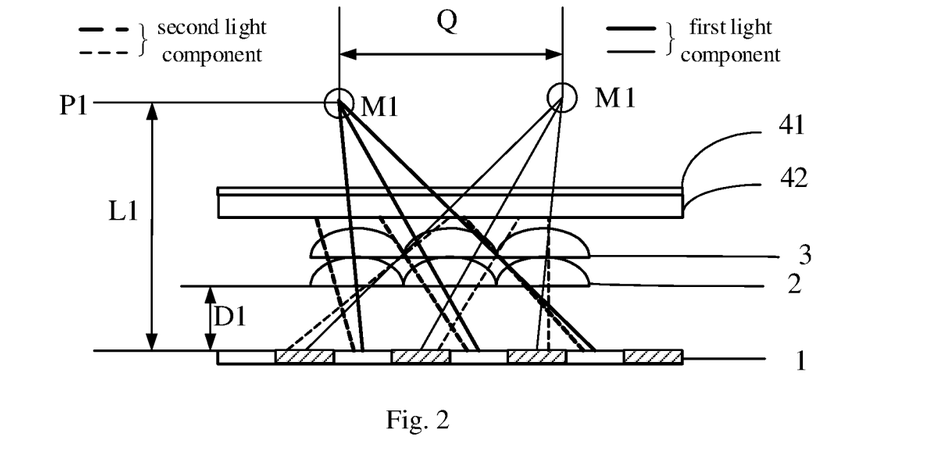
FIG. 2 is a schematic diagram of light paths when a light selection sublayer in the three-dimensional display device is in a first operational state in some embodiments of the present disclosure.

The first lenticulation 2 is configured to split the first light component and converge different light rays in the first light component and carrying different image information to at least two different first viewpoints M1, respectively, as shown in FIG. 2. The at least two different first viewpoints M1 are in a first plane P1 parallel to the display panel 1, and a vertical distance between the first plane P1 and the display surface 101 of the display panel 1 is a first distance L1.

Figure 4:
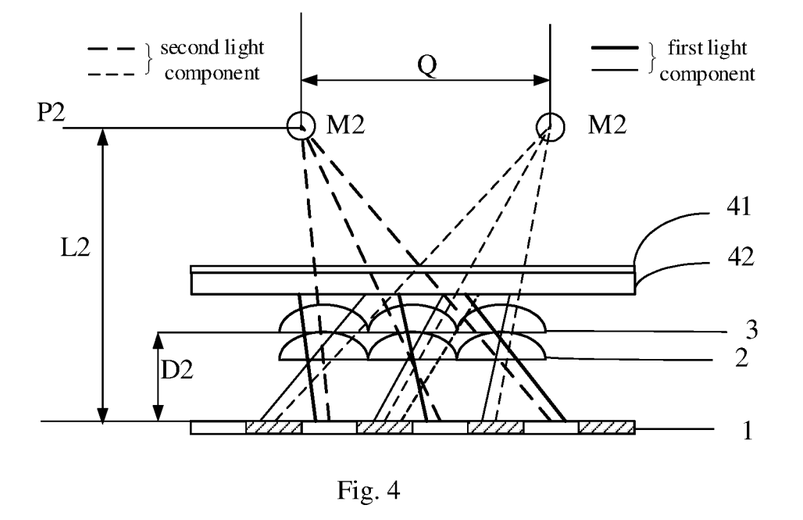
FIG. 4 is a schematic diagram of light paths when the light selection sublayer in the three-dimensional display device is in a second operational state in some embodiments of the present disclosure.

The second lenticulation 3 is configured to split the second light component and converge different light rays in the second light component and carrying different image information to at least two different second viewpoints M2, respectively, as shown in FIG. 4. The at least two different second viewpoints M2 are in a second plane P2 parallel to the display panel 1, and a vertical distance between the second plane P2 and the display surface 101 of the display panel 1 is a second distance L2.

The light selectively-transmissible layer 4 may operate in a first operational state and a second operational state. When the light selectively-transmissible layer 4 operates in the first operational state, the light selectively-transmissible layer 4 transmits the first light component; and when the light transmissible layer 4 operates in the second operational state, the light selectively-transmissible layer 4 transmits the second light component.

Figure 6:
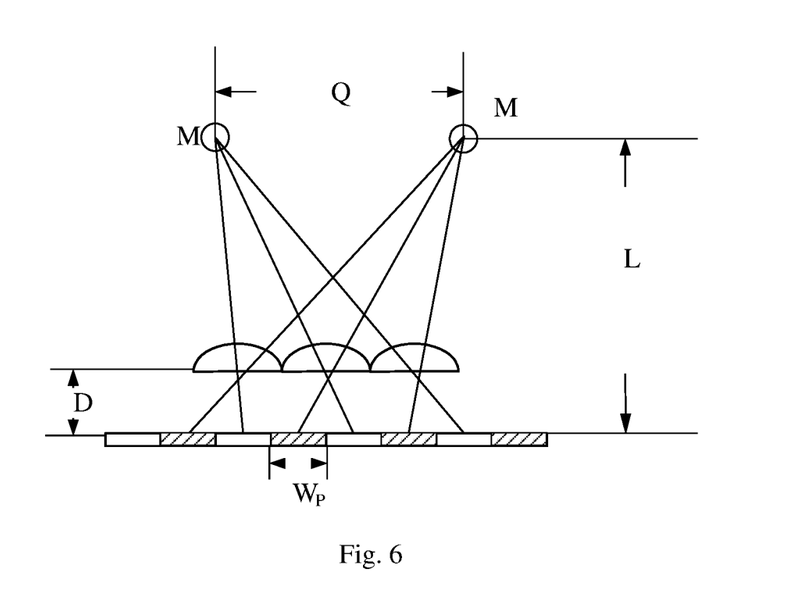
FIG. 6 is a schematic diagram of a principle of calculating a viewing distance of the three-dimensional display device in some embodiments of the present disclosure.

Referring to FIG. 6, "D" in FIG. 6 is a distance between the first lenticulation 2 or the second lenticulation 3 and the display surface 101 of the display panel 1. "Wp" is a size of each pixel in the display panel 1, "Q" is a pupillary distance of human eyes M, and L is a distance between the display surface of the display panel 1 and a plane in which a viewpoint of the human eyes is located. According to a formulation:

$$D = \frac{W_p L}{Q + W_p},$$

it may be known that with the size Wp of each pixel in the display panel 1 and the pupillary distance Q of the human eyes M being determined, the distance L between the display panel 1 and the plane in which the viewpoint is located is determined by the distance D between the first lenticulation 1 or the second lenticulation 3 and the display panel 1.

The first lenticulation 2 and the second lenticulation 3 are superimposed with each other, i.e., a distance between the first lenticulation 2 and the display surface of the display panel 1 and a distance between the first lenticulation 2 and the display surface of the display panel are different. Therefore, the first distance L1 between the display surface 101 of the display panel 1 and the first plane P1 in which the first viewpoints M1 are located and parallel to the display panel, and the second distance L2 between the display surface 101 of the display panel 1 and the second plane P2 in which the second viewpoints M2 are located and parallel to the display panel, are different. Therefore, a viewer may see a clear three-dimensional image at the first distance L1 from the display panel 1, and may also see a clear three-dimensional image at the second distance L2 from the display panel 1, and thereby a multi-distance viewing function of the three-dimensional display device is implemented and a viewing experience of the viewer is enhanced.

A specific structure of the light selectively-transmissible layer 4 may exhibit various forms, as long as when the light selectively-transmissible layer 4 operates in the first operational state, the light selectively-transmissible layer 4 transmits the first light component; and when the light transmissible layer 4 operates in the second operational state, the light selectively-transmissible layer 4 transmits the second light component.

In some embodiments of the present disclosure, the light selectively-transmissible layer 4 includes a polarizer 41 arranged at a light emergent side of the second lenticulation 3, and a direction of a light transmission axis of the polarizer 41 is the first direction; and a light selection sublayer 42 between the polarizer 41 and the second lenticulation 3 and configured to transmit the first light component and the second light component when the light selectively-transmissible layer 4 operates in the first operational state and change the polarization direction of the first light component to the second direction and change the polarization direction of the second light component to the first direction when the light selectively-transmissible layer 4 operates in the second operational state.

In some embodiments of the present disclosure, optionally, the light selectively-transmissible layer 4 includes the polarizer 41 arranged at the light emergent side of the second lenticulation 3 and the direction of the light transmission axis of the polarizer 41 is the second direction; and the light selection sublayer 42 between the polarizer 41 and the second lenticulation 3 and configured to change the polarization direction of the first light component to the second direction and change the polarization direction of the second light component to the first direction when the light selectively-transmissible layer 4 operates in the first operational state, and transmit the first light component and the second light component when the light selectively-transmissible layer 4 operates in the second operational state.

An operation mode of the light selectively-transmissible layer 4 is described hereinafter with an example that the first direction is a horizontal direction parallel to the display surface 101 of the display panel 1 and the second direction is a vertical direction perpendicular to the display surface 101 of the display panel 1.

In a case that the direction of the light transmission axis of the polarizer 41 is the horizontal direction and the light selectively-transmissible layer 4 operates in the first operational state, the polarization direction of the first light component is the horizontal direction after the first light component transmits through the first lenticulation 2, and after the first light component transmits through the light selection sublayer 42, the polarization direction of the first light component is still the horizontal direction. The polarization direction of the second light component is the vertical direction after the second light component transmits through the second lenticulation 3, and after the second light component transmits through the light selection sublayer 42, the polarization direction of the second light component is still the vertical direction. Since the direction of the light transmission axis of the polarizer 41 is the horizontal direction, the first light component may transmit through the polarizer 41, but the second light component cannot transmit through the polarizer 41.

In a case that the direction of the light transmission axis of the polarizer 41 is the horizontal direction and the light selectively-transmissible layer 4 operates in the second operational state, the polarization direction of the first light component is changed to the vertical direction after the first light component transmits through the first lenticulation 2 and the light selection sublayer 42; and the polarization direction of the second light component is changed to the horizontal direction after the second light component transmits through the second lenticulation 3 and the light selection sublayer 42. Since the direction of the light transmission axis of the polarizer 41 is the horizontal direction, the first light component cannot transmit through the polarizer 41, but the second light component may transmit through the polarizer 41.

In a case that the direction of the light transmission axis of the polarizer 41 is the vertical direction and the light selectively-transmissible layer 4 operates in the first operational state, the polarization direction of the first light component is the horizontal direction after the first light component transmits through the first lenticulation 2, and after the first light component transmits through the light selection sublayer 42, the polarization direction of the first light component is changed to the vertical direction. The polarization direction of the second light component is the vertical direction after the second light component transmits through the second lenticulation 3, and after the second light component transmits through the light selection sublayer 42, the polarization direction of the second light component is changed to the horizontal direction. Since the direction of the light transmission axis of the polarizer 41 is the vertical direction, the first light component may transmit through the polarizer 41, but the second light component cannot transmit through the polarizer 41.

In a case that the direction of the light transmission axis of the polarizer 41 is the vertical direction and the light selectively-transmissible layer 4 operates in the second operational state, the polarization direction of the first light component is still the horizontal direction after the first light component transmits through the first lenticulation 2 and the light selection sublayer 42; and the polarization direction of the second light component is still the vertical direction after the second light component transmits through the second lenticulation 3 and the light selection sublayer 42. Since the direction of the light transmission axis of the polarizer 41 is the vertical direction, the first light component cannot transmit through the polarizer 41, but the second light component may transmit through the polarizer 41.

Referring to FIGS. 2 and 4, the direction of the light transmission axis of the polarizer 41 in FIG. 2 and FIG. 4 is the horizontal direction, and solid lines in FIGS. 2 and 4 represent the first light component and dotted lines represent the second light component. As shown in FIG. 2, when the light selectively-transmissible layer 4 operates in the first operational state, the polarization direction of the first light component is the horizontal direction after the first light component transmits through the first lenticulation 2, and the polarization direction of the first light component is not changed after the first light component transmits through the light selection sublayer 42. The polarization direction of the first light component is the same as the direction of the light transmission axis of the polarizer 41, and thus the first light component may transmit through the polarizer 41. The polarization direction of the second light component is not changed after the second light component transmits through the second lenticulation 3 and the light selection sublayer 42. Since the polarization direction of the second light component is perpendicular to the direction of the light transmission axis of the polarizer 41, the second light component cannot transmit through the polarizer 41. As shown in FIG. 4, when the light selectively-transmissible layer 4 operates in the second operational state, the polarization direction of the first light component is changed to the vertical direction after the first light component transmits through the first lenticulation 2 and the light selection sublayer 42, and the polarization direction of the first light component is perpendicular to the direction of the light transmission axis of the polarizer 41, and thus the first light component cannot transmit through the polarizer 41; and the polarization direction of the second light component is changed to the horizontal direction after the second light component transmits through the second lenticulation 3 and the light selection sublayer 42. Since the polarization direction of the second light component is the same as the direction of the light transmission axis of the polarizer 41, the second light component may transmit through the polarizer 41.

A specific structure of the light selection sublayer 42 may exhibit various forms as long as the various forms may select light transmissible through the polarizer 41. In some embodiments of the present disclosure, the light selection sublayer 42 includes two first substrates and a liquid crystal layer between the two first substrates. The two first substrates are opposite to each other and between the second lenticulation 3 and the polarizer 41. A side of each of the first substrates facing towards the liquid crystal layer is provided with a first transparent electrode.

In a case that the direction of the light transmission axis of the polarizer 41 is the first direction and the light selectively-transmissible layer operates in the first operational state, the first transparent electrodes are applied with a voltage; and in a case that the light selectively-transmissible layer operates in the second operational state, the first transparent electrodes are not applied with the voltage. In a case that the direction of the light transmission axis of the polarizer 41 is the second direction, and the light selectively-transmissible layer operates in the first operational state, the first transparent electrodes are not applied with the voltage; and in a case that the light selectively-transmissible layer operates in the second operational state, the first transparent electrodes are applied with the voltage.

In some embodiments of the present disclosure, the light selection sublayer 42 is a liquid crystal cell. The liquid crystal cell includes a liquid crystal layer 423 and two first substrates 421 arranged at both sides of the liquid crystal layer 423 along a direction perpendicular to the polarizer 41, and a first transparent electrode 422 is arranged on one of the first substrates 421, and another transparent electrode 424 is arranged on the other of the first substrates 421.

Specifically, in some embodiments of the present disclosure, the light selection sublayer 42 is a Twisted Nematic liquid crystal cell. The Twisted Nematic Liquid crystal cell includes a Twisted Nematic liquid crystal layer 4231 and two first substrates 4211 arranged at both sides of the Twisted Nematic liquid crystal layer 4231 along a direction perpendicular to the polarizer 41, and one first transparent electrode 4221 is arranged on one of the first substrates 4211 and another first transparent electrode 4241 is arranged on the other of the first substrates 4241.

In a case that the direction of the light transmission axis of the polarizer is the first direction, and the light selectively-transmissible layer operates in the first operational state, the first transparent electrodes 4221 and 4241 are applied with a voltage; and in a case that light selectively-transmissible layer operates in the second operational state, the first transparent electrodes 4221 and 4241 are not applied with the voltage. In a case that the direction of the light transmission axis of the polarizer is the second direction and the light selectively-transmissible layer operates in the first operational state, the first transparent electrodes 4221 and 4241 are not applied with the voltage; and in a case that the light selectively-transmissible layer operates in the second operational state, the first transparent electrodes 4221 and 4241 are applied with the voltage.

Figure 3A:
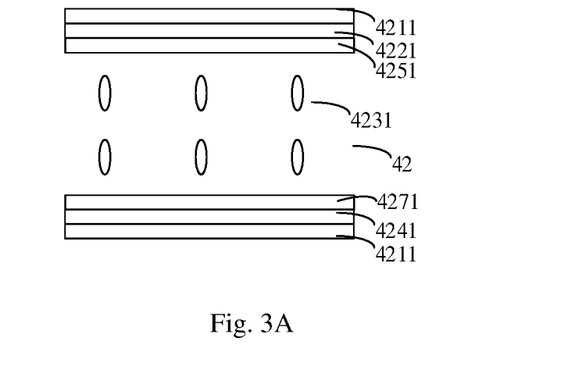
FIG. 3A and FIG. 3B are schematic diagrams of states of a liquid crystal cell when the light selection sublayer in the three-dimensional display device is applied with a voltage in some embodiments of the present disclosure.
Figure 3B:
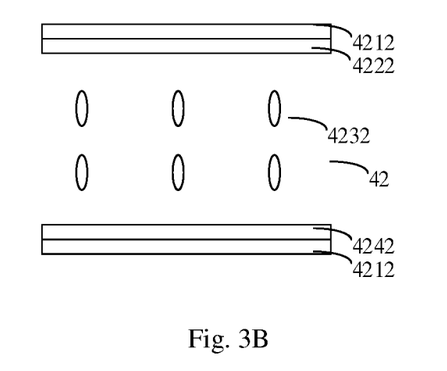
Figure 5A:
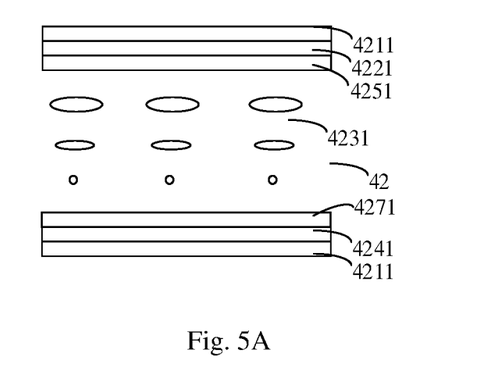
FIG. 5A and FIG. 5B are schematic diagrams of states of the liquid crystal cell when the light selection sublayer in the three-dimensional display device is not applied with the voltage in some embodiments of the present disclosure.

When the first transparent electrodes 4221 and 4241 are applied with the voltage, the optical rotation characteristics of the Twisted Nematic liquid crystal layer 4231 diminishes, and thus the polarization direction of light is not changed after the light transmits through the light selection sublayer 42, as shown in FIG. 3A. When the first transparent electrodes 4221 and 4241 are not applied with the voltage, the polarization direction of the light is rotated by 90 degrees under an action of the optical rotation characteristics of the Twisted Nematic liquid crystal layer 4231 after the light transmits through the Twisted Nematic liquid crystal 4231, as shown in FIG. 5A.

In some embodiments of the present disclosure, optionally, a first alignment layer 4251 having an alignment direction parallel to the direction of the light transmission axis of the polarizer 41 is arranged on the first transparent electrode 4221 adjacent to the polarizer 41, and a second alignment layer 4271 having an alignment direction perpendicular to the direction of the light transmission axis of the polarizer 41 is arranged on the first transparent electrode 4241 away from the polarizer 41, so that the Twisted Nematic liquid crystal layer has the optical rotation characteristic when the first transparent electrodes 4221 and 4241 are not applied with the voltage.

By selecting to apply the voltage to the light selection sublayer 42 or not, light transmissible through the polarizer 41 may be selected. In a case that the first direction is the horizontal direction and the second direction is the vertical direction and the direction of the light transmission axis of the polarizer 41 is the horizontal direction, if the first light component is selected to transmit through the polarizer 41, the first light component directly transmits through the polarizer 41 because the polarization direction of the first light component is the horizontal direction. In such a case, the first transparent electrodes 4221 and 4241 need to be applied with the voltage so that the optical rotation characteristic of the Twisted Nematic liquid crystal layer 4231 diminishes and the polarization direction of the first light component is not changed after the first light component transmits through the light selection sublayer 42. However, because the polarization direction of the second light component is the vertical direction and is not changed after the second light component transmits through the Twisted Nematic liquid crystal layer 4231, the second light component cannot transmit through the polarizer 5.

If the second light component is selected to transmit through the polarizer 41, the polarization direction of the second light component needs to be changed to the direction of the light transmission axis of the polarizer 41, i.e., the horizontal direction, because the polarization direction of the second light component is the vertical direction. In such a case, the first transparent electrodes 4221 and 4241 need not to be applied with the voltage. When the second light component is incident onto the light selection sublayer 42, the polarization direction of the second light component is changed to the horizontal direction under an action of the optical rotation characteristic of the Twisted Nematic liquid crystal layer 4231, and thus the second light component may transmit through the polarizer 41. However, the polarization direction of the first light component is changed to the vertical direction under the action of the optical rotation characteristic of the Twisted Nematic liquid crystal layer 4231, and thus cannot transmit through the polarizer 41.

Figure 5B:
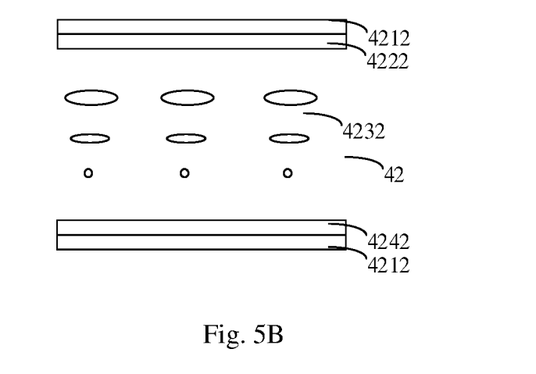

Optionally, referring to FIG. 5B, in some embodiments of the present disclosure, the light selection sublayer 42 may be a liquid crystal half-wave plate. The liquid crystal half-wave plate includes two second substrates 4212 arranged between the second lenticulation 3 and the polarizer 41 and opposite to each other, and a second liquid crystal layer 4232 between the two second substrates 4212. A second transparent electrode 4222 is arranged on one of the second substrates 4212, and another second transparent electrode 4242 is arranged on the other of the second substrates 4212.

In a case that the direction of the light transmission axis of the polarizer 41 is the first direction, and the light selectively-transmissible layer operates in the first operational state, the second transparent electrodes 4222, 4242 are applied with a voltage; and in a case that the light selectively-transmissible layer operates in the second operational state, the second transparent electrodes 4222, 4242 are not applied with the voltage. In a case that the direction of the light transmission axis of the polarizer 41 is the second direction and the light selectively-transmissible layer operates in the first operational state, the second transparent electrodes 4222, 4242 are not applied with the voltage; and in a case that the light selectively-transmissible layer operates in the second operational state, the second transparent electrodes 4222, 4242 are applied with the voltage. An angle between an initial alignment direction of the second liquid crystal layer 4232 and the direction of the light transmission axis of the polarizer 41 is 45 degrees, and a thickness of the second liquid crystal layer 4232 satisfies an equation, $(ne-no)*d=\lambda/2$, wherein $\lambda$ is a wavelength of an incident light incident on the second liquid crystal layer 4232, no is a refractive index of the second liquid crystal layer 4232 to the o light (ordinary light), and ne is a refractive index of the second liquid crystal layer 4232 to the e light (extraordinary light).

The liquid crystal half-wave plate does not change a polarization state of light when the second transparent electrodes 4222, 4242 are applied with a voltage, i.e., a polarization direction of light component transmitting through the liquid crystal half-wave plate is not changed; and the liquid crystal half-wave plate transforms a vertical polarization state of light to a horizontal polarization state or transform a horizontal polarization state of light to a vertical polarization state when the second transparent electrodes 4222, 4242 are not applied with a voltage, i.e., the polarization direction of the light transmitting through the liquid crystal half-wave plate may be rotated by 90 degrees by the liquid crystal half-wave plate. Thus, in the first operational state of the light selectively-transmissible layer, the first light component transmits through the polarizer 41, and in the second operational state of the light selectively-transmissible layer, the second light component transmits through the polarizer 41.

Figure 7:
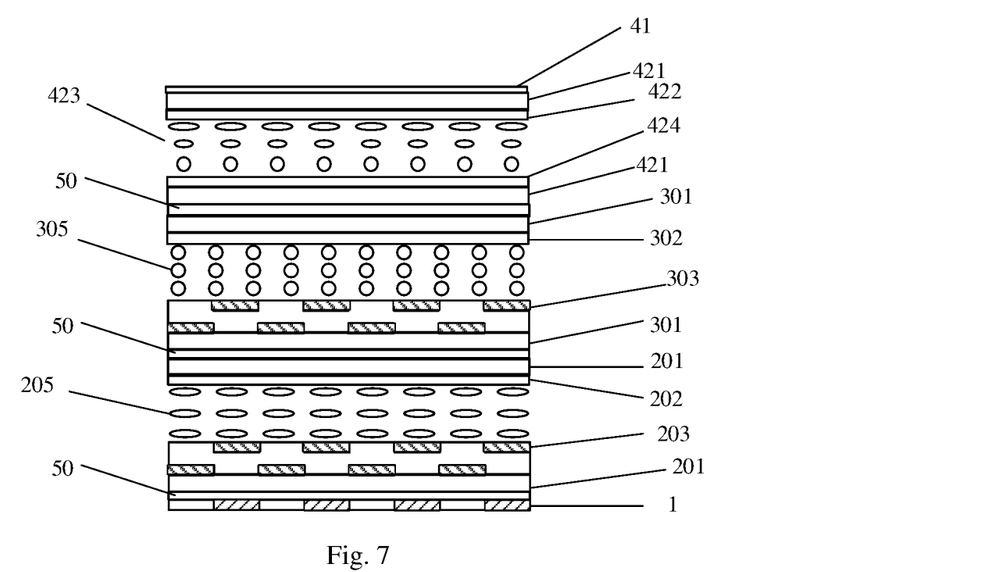
FIG. 7 is a first structural schematic diagram of a three-dimensional display device in some embodiments of the present disclosure.

A specific structure of the first lenticulation 2 may exhibit many forms. In some embodiments of the present disclosure, as shown in FIG. 7, the first lenticulation 2 is a liquid crystal lenticulation, and the first lenticulation 2 includes two third substrates 201 opposite to each other, and a third liquid crystal layer 205 between the two third substrates 201. A first planar electrode 202 is arranged on one of the third substrates 201, and a plurality of stripe electrodes 203 spaced from each other and parallel to each other is arranged on the other of the third electrodes 201. An initial alignment direction of the third liquid crystal layer 205 is the first direction, and the first planar electrode 202 and the plurality of first strip electrodes 203 are applied with different voltages so that liquid crystal molecules in the third liquid crystal layer 205 rotate by different angles and form a cylindrical lens having a plurality of first lens regions.

As shown in FIG. 1 the first lenticulation 2 includes at least three first lens regions 2001, each of the at least three first lens regions 2001 is a planoconvex lens. An incident surface of the planoconvex lens is a plane and an emergent surface of the planoconvex lens is a cambered surface protruding towards the light selectively-transmissible layer 4.

Figure 8:
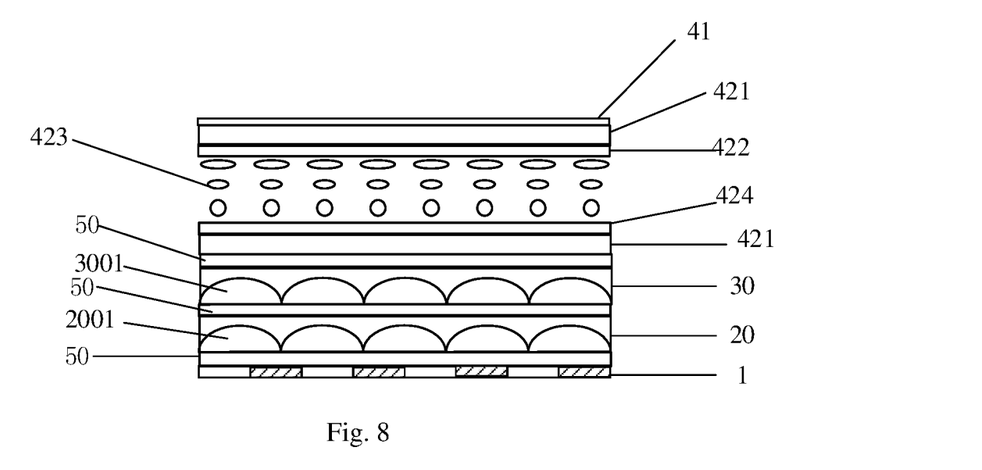
FIG. 8 is a second structural schematic diagram of a three-dimensional display device in some embodiments of the present disclosure.

As shown in FIG. 8, in some embodiments of the present disclosure, the first lenticulation 2 is a solid-state cylindrical lenticulation 20 having the plurality of first lens regions 2001 and formed of a first uniaxial crystal, and a direction of an optical axis of the first uniaxial crystal is the first direction.

Figure 9:
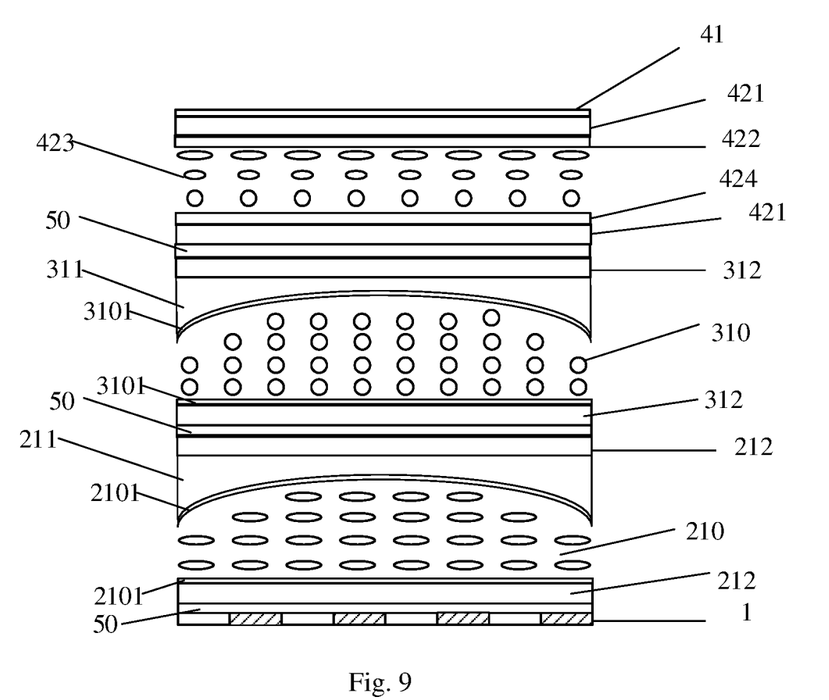
FIG. 9 is a third structural schematic diagram of a three-dimensional display device in some embodiments of the present disclosure.

Optionally, as shown in FIG. 9, in some embodiments of the present disclosure, the first lenticulation 2 includes two glass substrates 212 opposite to each other and a cylindrical lens structure 211 made of transparent materials and including a plurality of hollow first lens regions (FIG. 9 shows one of the plurality of first lens regions), and the cylindrical lens structure 211 is arranged between the two glass substrates 212, and each of the plurality of first lens regions is filled with liquid crystals 210. A light incident surface of each of the plurality of first lens regions is a plane, and a light emergent surface of the each of the plurality of first lens regions is a cambered surface protruding towards the light selectively-transmissible layer 4, and a first alignment layer 2101 is arranged on at least one of the light incident surface or the light emergent surface of the each of the plurality of first lens regions and configured to align the liquid crystals in the each of the plurality of first lens regions along the first direction.

In some embodiments of the present disclosure, in order to make viewers see more clear three-dimensional images, a focus point of each of the plurality of first lens regions is on the display surface 101 of the display panel 1.

The first distance L1 is calculated according to an equation as follows.

$$D1 = \frac{W_p L1}{Q + W_p},$$

wherein D1 is a distance between the first lenticulation 2 and the display surface 101 of the display panel 1, Wp is a size of each pixel in the display device, Q is a pupillary distance of human eyes, as shown in FIG. 2.

A specific structure of the second lenticulation 3 may exhibit many forms. In some embodiments of the present disclosure, as shown in FIG. 7, the second lenticulation 3 is a liquid crystal lenticulation, and the second lenticulation 3 includes two fourth substrates 301 opposite to each other, and a fourth liquid crystal layer 305 between the two fourth substrates 301. A second planar electrode 302 is arranged on one of the fourth substrates 301, and a plurality of stripe electrodes 303 spaced from each other and parallel to each other is arranged on the other of the fourth substrates 301.

An initial alignment direction of the fourth liquid crystal layer 305 is the second direction. The second planar electrode 302 and the plurality of second strip electrodes 303 are applied with different voltages so that liquid crystal molecules in the fourth liquid crystal layer 303 rotate by different angles and form a cylindrical lens structure having a plurality of second lens regions.

As shown in FIG. 1 the second lenticulation 3 includes at least three second lens regions, each of the at least three second lens regions is a planoconvex lens, an light incident surface of the planoconvex is a plane and a light emergent surface of the planoconvex is a cambered surface protruding towards the light selectively-transmissible layer 4.

As shown in FIG. 8, in some embodiments of the present disclosure, the second lenticulation 3 is a solid-state cylindrical lenticulation 30 having the plurality of second lens regions 3001 and formed of a second uniaxial crystal, and a direction of an optical axis of the second uniaxial crystal is the second direction.

Optionally, as shown in FIG. 9, in some embodiments of the present disclosure, the second lenticulation 3 includes two transparent substrates 312 opposite to each other and a cylindrical lens structure 311 made of transparent materials and including a plurality of hollow second lens regions (FIG. 9 shows one of the plurality of second lens regions), and the cylindrical lens structure 311 is arranged between the two transparent substrates 312, and each of the plurality of second lens regions is filled with liquid crystals 310. A light incident surface of each of the plurality of second lens regions is a plane, and a light emergent surface of the each of the plurality of second lens regions is a cambered surface protruding towards the light selectively-transmissible layer 4, and a second alignment layer 3101 is arranged on at least one of the light incident surface or the light emergent surface of the each of the plurality of second lens regions and is configured to align the liquid crystals in the each of the plurality of second lens regions along the second direction.

In some embodiments of the present disclosure, a focus point of each of the plurality of second lens regions is on the display surface 101 of the display panel 1.

The second distance L2 is calculated according to an equation as follows.

$$D2 = \frac{W_p L2}{Q + W_p},$$

D2 is a distance between the second lenticulation 3 and the display surface 101 of the display panel 1, Wp is the size of each pixel in the display device, Q is the pupillary distance of human eyes, as shown in FIG. 4.

In some embodiments of the present disclosure, the first lenticulation 2 and the second lenticulation 3 are cylindrical lenticulations, as shown in FIG. 1. The first lenticulation 2 and the second lenticulation 3 are parallel to each other, so that the first viewpoints and the second viewpoints are located at a same side of the display panel 1 to facilitate viewing of a viewer, but the present disclosure is not limited thereto.

It should be noted that the specific structures of the first lenticulation 2 and the second lenticulation 3 may be the same or different, and are not limited to the structures shown in FIGS. 7-9.

In the three-dimensional display device shown in FIGS. 7-9, the light selection sublayer 42 is attached to the first lenticulation 2 by a first adhesive layer 50, the first lenticulation 2 is attached to the second lenticulation 3 by a second adhesive layer 50, and the first lenticulation 2 is attached to the display panel 1 by a third adhesive layer 50. Optionally, the adhesive layers 50 may be a transparent glue layer.

It should be noted that, the voltage/the voltages mentioned above may be any voltage capable of cause the structures in the present disclosure to operate normally. Although a specific value range of the voltage is not provided, the range is easily obtained by one skilled in the art.

In some embodiments of the present disclosure, the display panel 1 is an organic electroluminescent display panel, or an autonomous lighting display panel, but the present disclosure is not limited thereto.

Some embodiments of the present disclosure further provide a display method applied to the above three-dimensional display device. The display method includes steps S11 and S12 as follows.

Step S11: splitting a first light component and converging light rays carrying different image information in the first light component to at least two different first viewpoints, respectively, wherein the first light component is a component of the natural light, and a polarization direction of the first light component is a first direction, the at least two different first viewpoints are in a first plane parallel to a display panel, and a distance between the first plane and a display surface of the display panel is a first distance.

Step S11: splitting a second light component and converging light rays carrying different image information in the second light component to at least two different second viewpoints, respectively, wherein the second light component is a component of the natural light, a polarization direction of the second light component is the second direction, the at least two different second viewpoints are in a second plane parallel to the display panel, and a distance between the second plane and the display surface of the display panel is the second distance; in the first operational state, the first light component is transmitted, and in the second operational state, the second light component is transmitted.

Figure 10:
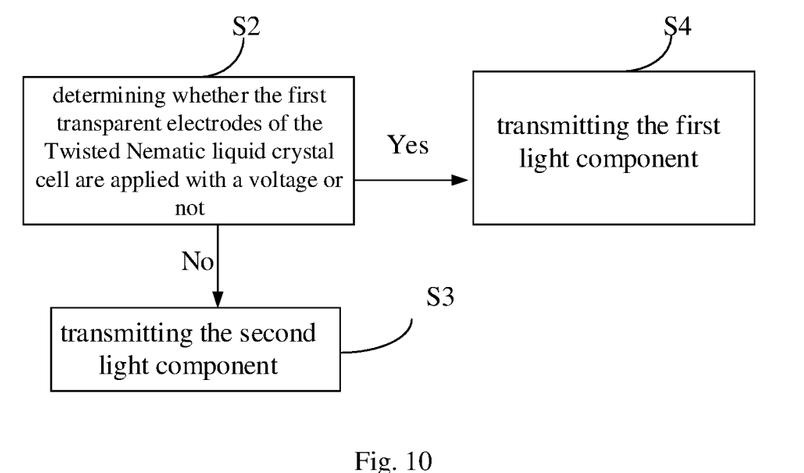
FIG. 10 is a flowchart of a three-dimensional display method in some embodiments of the present disclosure.

As shown in FIG. 10, in some embodiments of the present disclosure, in a case that the light selection sublayer is the Twisted Nematic liquid crystal cell, the first direction is the horizontal direction, and the second direction is the vertical direction, the direction of the light transmission axis of the polarizer is the first direction, and the first operational state is a state in which a voltage is supplied. the second operational state is a state in which no voltage is supplied, the display method specifically includes the following steps S2-S4.

Step S2: determining whether the first transparent electrodes of the Twisted Nematic liquid crystal cell are applied with a voltage or not.

Step S3: in case that the first transparent electrodes of the Twisted Nematic liquid crystal cell are not applied with the voltage, transmitting the second light component. In such a case, a distance between the human eyes and the display panel is L2 (i.e., the distance L2 between the viewpoints and the display panel), a best viewing experience is acquired.

Step S4: applying the voltage to the first transparent electrodes of the Twisted Nematic liquid crystal cell, transmitting the first light component. In such a case, the distance between the human eyes and the display panel is L1 (i.e., the distance L1 between the viewpoints and the display panel), a best viewing experience is acquired.

Although the first lenticulation is described as splitting the first light component, and the second lenticulation is described as splitting the second light component, one skilled in the art may think that in the above three-dimensional display device, the first lenticulation may split the second light component and the second lenticulation may split the second light component. Additionally, in the above three-dimensional display device, positions of the first lenticulation and the second lenticulation may be interchanged, i.e., the second lenticulation is closer to the display surface than the first lenticulation. Therefore, these variations also fall within the scope of the present disclosure.

In the present disclosure, the first lenticulation and the second lenticulation arranged in different layers provide more viewing distances for viewers of a glass-free three-dimensional display device.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A three-dimensional display device, comprising:
a display panel comprising a display surface, wherein the display surface is configured to emit natural light comprising a first light component and a second light component, a polarization direction of the first light component is a first direction, and a polarization direction of the second light component is a second direction, and the first direction is different from the second direction;
a first lenticulation above the display surface and configured to split the first light component and converge light rays carrying different image information in the first light component to at least two different first viewpoints, respectively, wherein the at least two different first viewpoints are in a first plane parallel to the display panel, and a distance between the first plane and the display surface of the display panel is a first distance;
a second lenticulation at one side of the first lenticulation facing away from the display surface and configured to split the second light component and converge light rays carrying different image information in the second light component to at least two different second viewpoints, respectively, wherein the at least two different second viewpoints are in a second plane parallel to the display panel, and a distance between the second plane and the display surface of the display panel is a second distance; and
a light selectively-transmissible layer at a side of the second lenticulation facing away from the first lenticulation and configured to operate in a first operational state or a second operational state, wherein in the first operational state, the first light component transmits through the light selectively-transmissible layer and in the second operational state, the second light component transmits through the light selectively-transmissible layer,
wherein the first distance is different from the second distance.

2. The three-dimensional display device according to claim 1, wherein light selective-transmissible layer comprises:
a polarizer at the side of the second lenticulation facing away from the first lenticulation, wherein a direction of a light transmission axis of the polarizer is configured to be the first direction or the second direction; and
a light selection sublayer between the polarizer and the second lenticulation, and configured to:
in a case that the direction of the light transmission axis of the polarizer is the first direction, transmit the first light component and the second light component when the light selectively-transmissible layer operates in the first operational state, and change the polarization direction of the first light component to the second direction and change the polarization direction of the second light component to the first direction when the light selectively-transmissible layer operates in the second operational state; and
in a case that the direction of the light transmission axis of the polarizer is the second direction, change the polarization direction of the first light component to the second direction and change the polarization direction of the second light component to the first direction when the light selectively-transmissible layer operates in the first operational state, and transmit the first light component and the second light component when the light selectively-transmissible layer operates in the second operational state.

3. The three-dimensional display device according to claim 2, wherein the light selection sublayer is attached to the first lenticulation by a first adhesive layer, the first lenticulation is attached to the second lenticulation by a second adhesive layer, and the first lenticulation is attached to the display panel by a third adhesive layer.

4. The three-dimensional display device according to claim 2, wherein the first direction is perpendicular to the second direction, and the light selection sublayer is a liquid crystal cell.

5. The three-dimensional display device according to claim 4, wherein the light selection sublayer comprises a first liquid crystal layer and two first substrates, the two first substrates are opposite to each other, between the second lenticulation and the polarizer and perpendicular to the polarizer, and the first liquid crystal layer is between the two first substrates, and a side of each of the first substrates facing towards the liquid crystal layer is provided with a first transparent electrode, and wherein:
in a case that the direction of the light transmission axis of the polarizer is the first direction, when the light selectively-transmissible layer operates in the first operational state, the first transparent electrodes are applied with a voltage; and when the light selectively-transmissible layer operates in the second operational state, the first transparent electrodes are not applied with the voltage; and
in a case that the direction of the light transmission axis of the polarizer is the second direction, when the light selectively-transmissible layer operates in the first operational state, the first transparent electrodes are not applied with the voltage; and when the light selectively-transmissible layer operates in the second operational state, the first transparent electrodes are applied with the voltage.

6. The three-dimensional display device according to claim 5, wherein the light selection sublayer is a Twisted Nematic liquid crystal cell, a first alignment layer is arranged on a first one of the first transparent electrodes adjacent to the polarizer and an alignment direction of the first alignment layer is parallel to the direction of the light transmission axis of the polarizer, and a second alignment layer is arrange on a second one of the first transparent electrodes away from the polarizer and an alignment direction of the second alignment layer is perpendicular to the direction of the light transmission axis of the polarizer.

7. The three-dimensional display device according to claim 5, wherein the light selection sublayer is a liquid crystal half-wave plate, an angle between an initial alignment direction of the first liquid crystal layer and the direction of the light transmission axis of the polarizer is 45 degrees, and a thickness d of the first liquid crystal layer satisfies an equation $(ne-no)*d=\lambda/2$, wherein $\lambda$ is a wavelength of incident light incident on the first liquid crystal layer, no is a refractive index of the first liquid crystal layer to ordinary light, and ne is a refractive index of the first liquid crystal layer to extraordinary light.

8. A display method applied to the three-dimensional display device according to claim 5, comprising:
   determining whether the first transparent electrodes are applied with a voltage or not;
   transmitting the first light component when the first transparent electrodes are applied with the voltage; and
   transmitting the second light component when the first transparent electrodes are not applied with the voltage.

9. The three-dimensional display device according to claim 4, wherein:
   the first direction is parallel to the display surface, the second direction is perpendicular to the display surface; or
   the first direction is perpendicular to the display surface, the second direction is parallel to the display surface.

10. The three-dimensional display device according to claim 1, wherein the first lenticulation comprises two third substrates opposite to each other and a third liquid crystal layer between the third substrates, and wherein:
   a first planar electrode is arranged on a first one of the third substrates;
   a plurality of stripe electrodes spaced from each other and parallel to each other is arranged on a second one of the third substrates;
   an initial alignment direction of the third liquid crystal layer is the first direction; and
   the first planar electrode and the plurality of first stripe electrodes are applied with different voltages so that liquid crystal molecules in the third liquid crystal layer rotates by different angles and form a cylindrical lens structure having a plurality of first lens regions.

11. The three-dimensional display device according to claim 10, wherein a focus point of each of the plurality of first lens regions is on the display surface of the display panel.

12. The three-dimensional display device according to claim 1, wherein the first lenticulation is a solid-state cylindrical lenticulation having a plurality of first lens regions and formed of a first uniaxial crystal, and a direction of an optical axis of the first uniaxial crystal is the first direction.

13. The three-dimensional display device according to claim 1, wherein the first lenticulation comprises a cylindrical lens structure formed of a transparent material and comprising a plurality of hollow first lens regions, each of the plurality of first lens regions is filled with liquid crystals, a light incident surface of each of the plurality of first lens regions is a plane, and a light emergent surface of the each of the plurality of first lens regions is a cambered surface protruding towards the light selectively-transmissible layer, and a first alignment layer is arranged on at least one of the light incident surface or the light emergent surface of the each of the plurality of first lens regions and is configured to align the liquid crystals in the each of the plurality of first lens regions along the first direction.

14. The three-dimensional display device according to claim 1, wherein the first distance L1 is calculated according to an equation of $$D1 = \frac{W_p L1}{Q + W_p},$$

and
the second distance L2 is calculated according to an equation of $$D2 = \frac{W_p L2}{Q + W_p},$$

wherein D1 is a distance between the first lenticulation and the display surface of the display panel, D2 is a distance between the second lenticulation and the display surface of the display panel, and Wp is a size of each pixel in the display panel, and Q is a pupillary distance of human eyes.

15. The three-dimensional display device according to claim 1, wherein the second lenticulation comprises two fourth substrates opposite to each other and a fourth liquid crystal layer between the fourth substrates, and wherein:
   a second planar electrode is arranged on a first one of the fourth substrates;
   a plurality of second stripe electrodes spaced from each other and parallel to each other is arranged on a second one of the fourth substrates;
   an initial alignment direction of liquid crystal molecules in the fourth liquid crystal layer is the second direction; and
   the second planar electrode and the plurality of second stripe electrodes are applied with different voltages so that the liquid crystal molecules in the fourth liquid crystal layer rotate by different angles and form a cylindrical lens structure having a plurality of second lens regions.

16. The three-dimensional display device according to claim 15, wherein a focus point of each of the plurality of second lens regions is on the display surface of the display panel.

17. The three-dimensional display device according to claim 1, wherein the second lenticulation is a solid-state cylindrical lenticulation having a plurality of second lens regions and formed of a second uniaxial crystal, and a direction of an optical axis of the second uniaxial crystal is the second direction.

18. The three-dimensional display device according to claim 1, wherein the second lenticulation comprises a cylindrical lens structure formed of a transparent material and comprising a plurality of hollow second lens regions, wherein each of the plurality of second lens regions is filled with liquid crystals, a light incident surface of each of the plurality of second lens regions is a plane, and a light emergent surface of the each of the plurality of second lens regions is a cambered surface protruding towards the light selectively-transmissible layer, and a second alignment layer is arranged on at least one of the light incident surface or the light emergent surface of the each of the plurality of second lens regions and is configured to align the liquid crystals in the each of the plurality of second lens regions along the second direction.

19. A display method applied to the three-dimensional display device according to claim 1, comprising:
   splitting the first light component and converging different light rays carrying different image information in the first light component to at least two different first viewpoints, respectively, by the first lenticulation; and
   splitting the second light component and converging different light rays carrying different image information in the second light component to at least two different second viewpoints, respectively, by the second lenticulation.

* * * * *